United States Patent
Luecke

Patent Number: 5,596,456
Date of Patent: Jan. 21, 1997

[54] ACHROMATIC ANAMORPHIC PRISM PAIR

[75] Inventor: Francis C. Luecke, San Jose, Calif.

[73] Assignee: New Focus, Inc., Santa Clara, Calif.

[21] Appl. No.: 201,662

[22] Filed: Feb. 25, 1994

[51] Int. Cl.⁶ .............................. G02B 5/04; G02B 7/18; G02B 13/10
[52] U.S. Cl. .......................... 359/831; 359/837; 359/669; 359/670
[58] Field of Search .................................. 359/831, 837, 359/668, 669, 670; 372/100; 369/112

[56] References Cited

U.S. PATENT DOCUMENTS

| | | |
|---|---|---|
| 4,084,881 | 4/1978 | Hirabayashi et al. |
| 4,127,828 | 11/1978 | Klauminzer ............................ 359/837 |
| 4,580,879 | 4/1986 | Wilson .................................... 359/837 |
| 4,609,258 | 9/1986 | Adachi et al. .......................... 359/488 |
| 4,750,819 | 6/1988 | Sugiki .................................... 359/837 |
| 4,754,446 | 6/1988 | Reno ...................................... 369/112 |
| 4,770,507 | 9/1988 | Arimoto et al. ........................ 359/837 |
| 4,819,096 | 4/1989 | Grant et al. |
| 4,855,761 | 8/1989 | Hiiro . |
| 4,872,747 | 10/1989 | Jalkio et al. |
| 4,904,068 | 2/1990 | Tatsuno et al. |
| 4,948,233 | 8/1990 | Maruyama . |
| 4,972,429 | 11/1990 | Herbst ..................................... 372/100 |
| 5,013,136 | 5/1991 | Whitehead et al. ..................... 359/834 |
| 5,103,457 | 4/1992 | Wallace et al. ......................... 372/92 |
| 5,155,633 | 10/1992 | Grove et al. ............................ 359/837 |
| 5,212,710 | 5/1993 | Kaneda et al. . |
| 5,274,489 | 12/1993 | Smith et al. ............................ 359/837 |
| 5,321,717 | 6/1994 | Adachi et al. .......................... 372/100 |

FOREIGN PATENT DOCUMENTS

| | | | |
|---|---|---|---|
| 0020924 | 1/1986 | Japan ..................................... 359/837 |
| 0240220 | 10/1986 | Japan ..................................... 359/837 |
| 0163320 | 7/1988 | Japan ..................................... 359/837 |
| 4022913 | 1/1992 | Japan ..................................... 359/837 |

Primary Examiner—Ricky D. Shafer
Attorney, Agent, or Firm—Hugh D. Jaeger

[57] ABSTRACT

An achromatic anamorphic prism pair for the conversion of the elliptical output beam of a tunable diode laser to a circular beam. The achromatic design prevents a directional shift in the output beam with respect to the optical axis of the system laser wavelength is varied.

8 Claims, 15 Drawing Sheets entrant face inclinations exaggerated for clarity

| $\lambda_i$ | $n1_i$ | $n2_i$ | $\delta_i$ | $R_i$ | $\theta t1_i$ deg | $\theta i2_i$ deg | $\theta t2_i$ deg | $\theta i3_i$ deg | $\iota\_\_i$ deg | $\theta i4_i$ deg | $\theta t4_i$ deg | $H_i$ |
|---|---|---|---|---|---|---|---|---|---|---|---|---|
| 0.6 | 1.5228 | 1.7829 | -0.022 | 3.071 | -0.657 | 36.584 | 65.172 | -0.972 | -0.545 | 27.929 | 56.623 | 6.785 |
| 0.62 | 1.5218 | 1.7802 | -0.013 | 3.06 | -0.657 | 36.584 | 65.097 | -1.047 | -0.588 | 27.972 | 56.614 | 6.779 |
| 0.64 | 1.521 | 1.7778 | -0.006 | 3.05 | -0.657 | 36.584 | 65.029 | -1.115 | -0.627 | 28.011 | 56.607 | 6.774 |
| 0.66 | 1.5202 | 1.7756 | -0.002 | 3.042 | -0.658 | 36.585 | 64.967 | -1.177 | -0.663 | 28.047 | 56.602 | 6.77 |
| 0.68 | 1.5195 | 1.7736 | 0.002 | 3.034 | -0.658 | 36.585 | 64.91 | -1.234 | -0.696 | 28.08 | 56.599 | 6.766 |
| 0.7 | 1.5188 | 1.7718 | 0.004 | 3.027 | -0.658 | 36.585 | 64.857 | -1.287 | -0.726 | 28.11 | 56.597 | 6.762 |
| 0.72 | 1.5182 | 1.7702 | 0.005 | 3.021 | -0.659 | 36.586 | 64.808 | -1.336 | -0.754 | 28.138 | 56.596 | 6.758 |
| 0.74 | 1.5176 | 1.7686 | 0.005 | 3.015 | -0.659 | 36.586 | 64.763 | -1.381 | -0.781 | 28.165 | 56.596 | 6.755 |
| 0.76 | 1.5171 | 1.7672 | 0.004 | 3.01 | -0.659 | 36.586 | 64.721 | -1.423 | -0.805 | 28.189 | 56.597 | 6.752 |
| 0.78 | 1.5166 | 1.766 | 0.002 | 3.005 | -0.659 | 36.586 | 64.681 | -1.463 | -0.828 | 28.212 | 56.599 | 6.749 |
| 0.8 | 1.5161 | 1.7648 | 0 | 3 | -0.66 | 36.587 | 64.644 | -1.5 | -0.85 | 28.234 | 56.601 | 6.746 |
| 0.82 | 1.5157 | 1.7636 | -0.003 | 2.996 | -0.66 | 36.587 | 64.609 | -1.535 | -0.87 | 28.254 | 56.604 | 6.743 |
| 0.84 | 1.5153 | 1.7626 | -0.006 | 2.992 | -0.66 | 36.587 | 64.576 | -1.568 | -0.89 | 28.274 | 56.607 | 6.741 |
| 0.86 | 1.5148 | 1.7616 | -0.01 | 2.988 | -0.66 | 36.587 | 64.544 | -1.6 | -0.908 | 28.292 | 56.611 | 6.739 |
| 0.88 | 1.5145 | 1.7607 | -0.014 | 2.985 | -0.66 | 36.587 | 64.514 | -1.63 | -0.925 | 28.309 | 56.615 | 6.736 |
| 0.9 | 1.5141 | 1.7599 | -0.019 | 2.981 | -0.66 | 36.587 | 64.486 | -1.658 | -0.942 | 28.326 | 56.62 | 6.734 |
| 0.92 | 1.5137 | 1.7591 | -0.024 | 2.978 | -0.661 | 36.588 | 64.458 | -1.686 | -0.958 | 28.342 | 56.625 | 6.732 |
| 0.94 | 1.5134 | 1.7583 | -0.03 | 2.975 | -0.661 | 36.588 | 64.432 | -1.712 | -0.974 | 28.357 | 56.63 | 6.73 |
| 0.96 | 1.5131 | 1.7576 | -0.035 | 2.973 | -0.661 | 36.588 | 64.407 | -1.737 | -0.988 | 28.372 | 56.636 | 6.728 |
| 0.98 | 1.5128 | 1.7569 | -0.041 | 2.97 | -0.661 | 36.588 | 64.382 | -1.762 | -1.003 | 28.386 | 56.642 | 6.727 |
| 1 | 1.5125 | 1.7562 | -0.048 | 2.968 | -0.661 | 36.588 | 64.359 | -1.785 | -1.016 | 28.4 | 56.648 | 6.725 |
| 1.02 | 1.5122 | 1.7556 | -0.054 | 2.965 | -0.661 | 36.588 | 64.336 | -1.808 | -1.03 | 28.414 | 56.655 | 6.723 |
| 1.04 | 1.5119 | 1.755 | -0.061 | 2.963 | -0.661 | 36.588 | 64.314 | -1.83 | -1.043 | 28.427 | 56.662 | 6.721 |
| 1.06 | 1.5116 | 1.7544 | -0.068 | 2.961 | -0.662 | 36.589 | 64.292 | -1.852 | -1.055 | 28.439 | 56.669 | 6.72 |
| 1.08 | 1.5113 | 1.7539 | -0.076 | 2.959 | -0.662 | 36.589 | 64.271 | -1.873 | -1.068 | 28.452 | 56.676 | 6.718 |
| 1.1 | 1.5111 | 1.7534 | -0.083 | 2.957 | -0.662 | 36.589 | 64.25 | -1.894 | -1.08 | 28.464 | 56.684 | 6.717 |
| 1.12 | 1.5108 | 1.7528 | -0.091 | 2.955 | -0.662 | 36.589 | 64.23 | -1.914 | -1.092 | 28.476 | 56.692 | 6.715 |
| 1.14 | 1.5106 | 1.7524 | -0.099 | 2.953 | -0.662 | 36.589 | 64.21 | -1.934 | -1.103 | 28.487 | 56.7 | 6.714 |
| 1.16 | 1.5103 | 1.7519 | -0.107 | 2.951 | -0.662 | 36.589 | 64.191 | -1.953 | -1.115 | 28.499 | 56.708 | 6.712 |
| 1.18 | 1.5101 | 1.7514 | -0.115 | 2.95 | -0.662 | 36.589 | 64.172 | -1.972 | -1.126 | 28.51 | 56.716 | 6.711 |
| 1.2 | 1.5098 | 1.751 | -0.124 | 2.948 | -0.662 | 36.589 | 64.153 | -1.991 | -1.137 | 28.521 | 56.725 | 6.71 |
| 1.22 | 1.5096 | 1.7505 | -0.133 | 2.946 | -0.662 | 36.589 | 64.134 | -2.01 | -1.148 | 28.532 | 56.734 | 6.708 |
| 1.24 | 1.5093 | 1.7501 | -0.142 | 2.945 | -0.663 | 36.59 | 64.116 | -2.028 | -1.159 | 28.542 | 56.742 | 6.707 |
| 1.26 | 1.5091 | 1.7497 | -0.151 | 2.943 | -0.663 | 36.59 | 64.098 | -2.046 | -1.169 | 28.553 | 56.752 | 6.705 |
| 1.28 | 1.5089 | 1.7493 | -0.16 | 2.942 | -0.663 | 36.59 | 64.08 | -2.064 | -1.18 | 28.564 | 56.761 | 6.704 |
| 1.3 | 1.5086 | 1.7489 | -0.17 | 2.94 | -0.663 | 36.59 | 64.062 | -2.082 | -1.19 | 28.574 | 56.77 | 6.703 |
| 1.32 | 1.5084 | 1.7485 | -0.179 | 2.939 | -0.663 | 36.59 | 64.044 | -2.1 | -1.201 | 28.585 | 56.78 | 6.701 |
| 1.34 | 1.5082 | 1.7481 | -0.189 | 2.937 | -0.663 | 36.59 | 64.027 | -2.117 | -1.211 | 28.595 | 56.79 | 6.7 |
| 1.36 | 1.5079 | 1.7477 | -0.199 | 2.936 | -0.663 | 36.59 | 64.009 | -2.135 | -1.221 | 28.605 | 56.8 | 6.699 |
| 1.38 | 1.5077 | 1.7474 | -0.209 | 2.935 | -0.663 | 36.59 | 63.992 | -2.152 | -1.231 | 28.615 | 56.81 | 6.698 |
| 1.4 | 1.5075 | 1.747 | -0.219 | 2.933 | -0.663 | 36.59 | 63.975 | -2.169 | -1.242 | 28.626 | 56.82 | 6.696 |
| 1.42 | 1.5073 | 1.7466 | -0.23 | 2.932 | -0.663 | 36.59 | 63.957 | -2.187 | -1.252 | 28.636 | 56.831 | 6.695 |
| 1.44 | 1.507 | 1.7463 | -0.24 | 2.931 | -0.664 | 36.591 | 63.94 | -2.204 | -1.262 | 28.646 | 56.841 | 6.694 |
| 1.46 | 1.5068 | 1.7459 | -0.251 | 2.93 | -0.664 | 36.591 | 63.923 | -2.221 | -1.272 | 28.656 | 56.852 | 6.692 |
| 1.48 | 1.5066 | 1.7456 | -0.262 | 2.928 | -0.664 | 36.591 | 63.906 | -2.238 | -1.282 | 28.666 | 56.863 | 6.691 |
| 1.5 | 1.5064 | 1.7452 | -0.273 | 2.927 | -0.664 | 36.591 | 63.888 | -2.256 | -1.292 | 28.676 | 56.874 | 6.69 |
| 1.52 | 1.5061 | 1.7449 | -0.284 | 2.926 | -0.664 | 36.591 | 63.871 | -2.273 | -1.302 | 28.686 | 56.885 | 6.689 |
| 1.54 | 1.5059 | 1.7446 | -0.296 | 2.925 | -0.664 | 36.591 | 63.854 | -2.29 | -1.312 | 28.696 | 56.897 | 6.687 |
| 1.56 | 1.5057 | 1.7442 | -0.307 | 2.923 | -0.664 | 36.591 | 63.837 | -2.307 | -1.323 | 28.706 | 56.908 | 6.686 |
| 1.58 | 1.5055 | 1.7439 | -0.319 | 2.922 | -0.664 | 36.591 | 63.82 | -2.325 | -1.333 | 28.717 | 56.92 | 6.685 |

ACHROMATIC ANAMORPHIC PRISM PAIR

BACKGROUND OF THE INVENTION

1. Field of the Invention

The present invention relates to optical devices incorporating prisms, and more particularly to an achromatic prism pair for the conversion of the elliptical beam from a tunable diode laser to a beam of circular cross section.

2. Description of the Prior Art

It has been recognized that the elliptically shaped output beam from a diode laser can be converted into the more desirable circular beam by the use of cylindrical lenses or, more desirably, a pair of prisms. The output beam from a diode laser, even when collimated by a lens, is generally in the form of an ellipse, typically one with an aspect ratio of 3 to 1. The elliptical shape does not lend itself to optimal performance of the associated system, which gave rise to various techniques for converting the elliptical beam into a round one. Obviously, the conversion device should not contribute to a deterioration in the other characteristics of the radiation or unduly complicate the optical system. The prism approach has been found to be a more practical approach than the use of lenses and the prism configuration may be selected to provide various fixed magnifications along one axis. Typical magnification ratios range from 2 to 6 times to accommodate lasers of various ellipticities. Such prisms are quite effective for the intended purpose at a fixed wavelength but possess serious shortcomings when the laser wavelength is varied.

SUMMARY OF THE INVENTION

The general purpose of the present invention is to provide a anamorphic prism pair which does not change the angle of the circular output beam when the wavelength is varied. Prior art anamorphic prism pairs have wavelength dependent characteristics which cause the angle of the laser beam to change with wavelength. This shortcoming creates problems in systems using tunable diode lasers. When the angle of the output beam changes, other components of the system have to be realigned. The realignment of the system each time the wavelength is varied is a substantial inconvenience. Even when an attempt is made to hold the output wavelength of a typical laser to a constant value, slight variations in the diode laser, for example, those caused by temperature changes at start-up or those induced by variations in output power, can lead to corresponding changes in wavelength. While the changes in wavelength may be otherwise slight, they are frequently sufficient to destroy the precise alignment of the system.

The anamorphic, non-spherical, lenses used in the conversion from elliptical to spherical beams are typically cylindrical and quite difficult, and therefore expensive, to fabricate. The lenses also introduced other undesirable aberrations.

It is possible to design a single achromatic prism which provides achromatic performance over the band of wavelength which is capable of being tuned by a diode laser. It is also possible to combine two "achromatic" prisms in a design which provides the requisite anamorphic conversion of the elliptical beam to that of circular cross section. While such designs are believed possible, the use of four prisms substantially increases the expense of such devices. The increased expense arises not only from the need to fabricate two additional prisms but also from the additional assembly and alignment problems introduced by the use of four prisms instead of just two. Even further, the two additional glass to glass surfaces degrade the optical performance of the device, in accordance with the general rule in optical design that "less is better".

Certain other constraints exist on the design of anamorphic prisms for diode lasers. For example, there must be no surface which is capable of introducing a reflected wave back into the diode laser.

One significant aspect and feature of the present invention is to provide an achromatic anamorphic device which utilizes but two prisms.

Another significant aspect and feature of the present invention is to provide a two prism anamorphic device having a constant output beam angle over a 20 nanometer range of wavelength.

A further significant aspect and feature of the present invention is to provide a two prism achromatic anamorphic device which converts an elliptical input beam into a circular output beam having a diameter corresponding to the minor axis of the ellipse.

An additional significant aspect and feature of the present invention is to provide a two prism achromatic anamorphic device which includes no optical surface oriented in a fashion which can reflect radiation back along the entrant path.

Still another significant aspect and feature of the present invention is to provide a two prism achromatic anamorphic device which is no more difficult to fabricate than conventional two prism devices.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference characters designate like parts throughout the figures thereof and wherein:

FIG. 11 is a chart showing values for beam angles and beam offset distances for a range of input wavelength for 600 nanometers to 1600 nanometers.

DETAILED DESCRIPTION OF THE PREFERRED EMBODIMENTS

Figure 1:
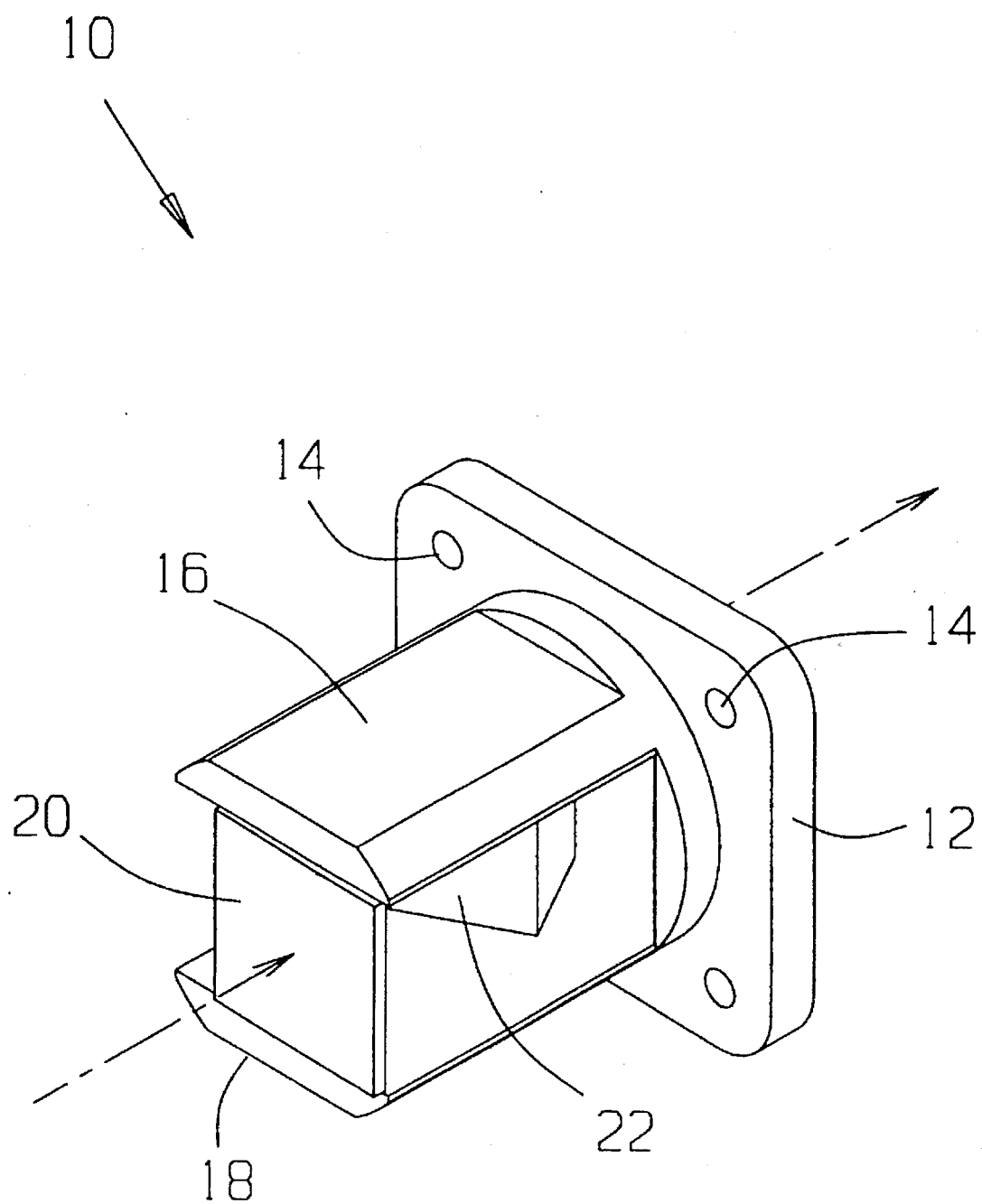
FIG. 1 is an isometric view of the achromatic anamorphic prism pair of this invention.

With reference to FIG. 1, the two prism achromatic anamorphic device 10 has a mounting flange 12 containing a plurality of holes 14 for accommodation of mounting screws which may be used to secure the device to an appropriate clamp or structure. Right prism support leg 16 and left prism support leg 18 are spaced apart a distance corresponding to the width of first prism 20 and second prism 22 to allow for easy assembly and mounting with a suitable adhesive. The elliptical incident beam is directed onto the rear face of prism 20 and, after conversion to circular cross section, emerges from a hole in the mounting flange 12.

Figure 2:
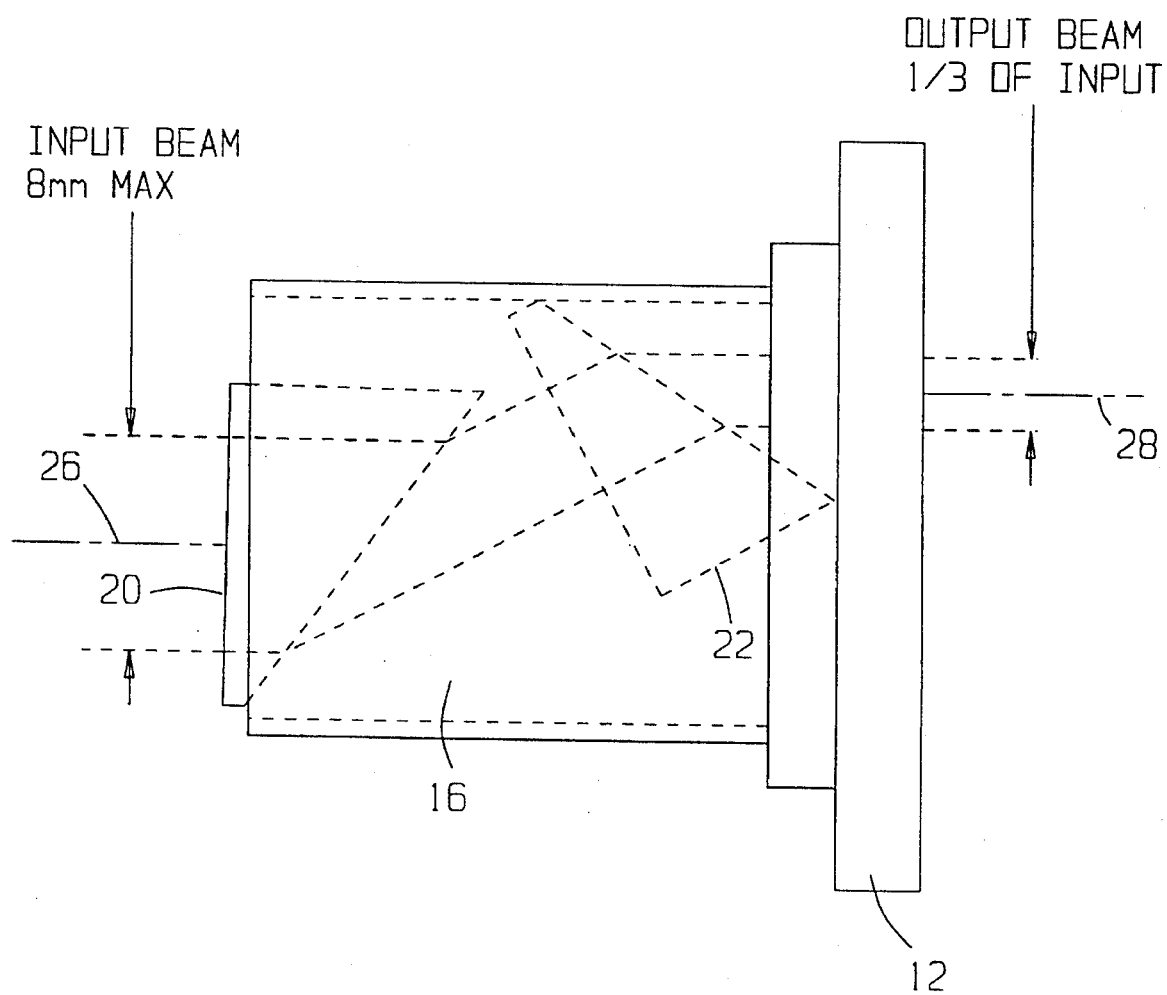
FIG. 2 is a side view of the achromatic anamorphic prism pair of this invention.

FIG. 2 is a side view showing the relative positions of the elliptical incident beam 26 and the circular emergent beam 28, illustrating the lateral displacement of the emergent beam 28 from the input beam 26.

Figure 3:
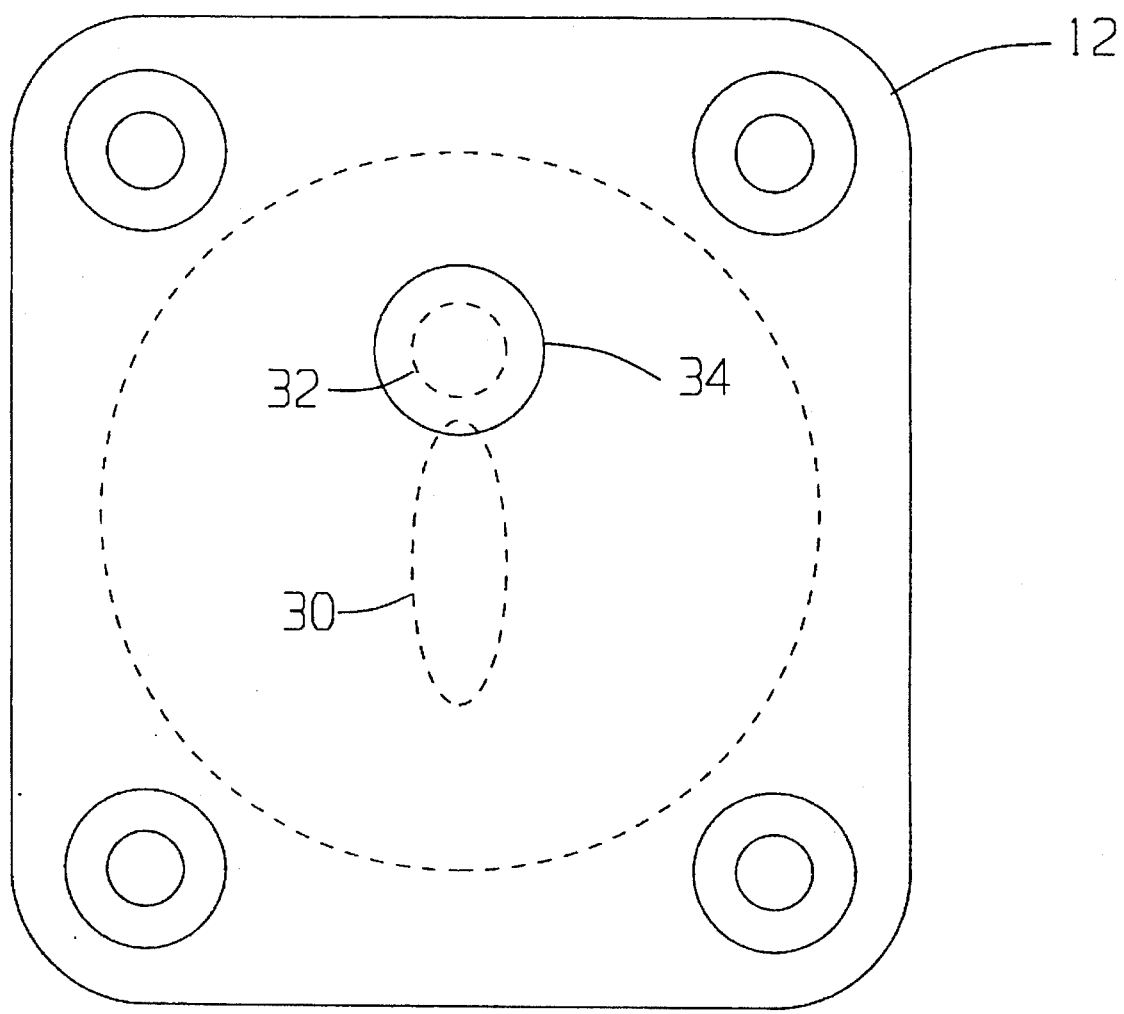
FIG. 3 is an end view taken from the emergent end of the achromatic anamorphic prism pair of this invention.

FIG. 3 is an end view taken from the output end showing the relative cross-sectional shapes of the elliptical incident beam 30 and the circular emergent beam 32, which passes through output aperture 34 in flange 12.

Figure 4:
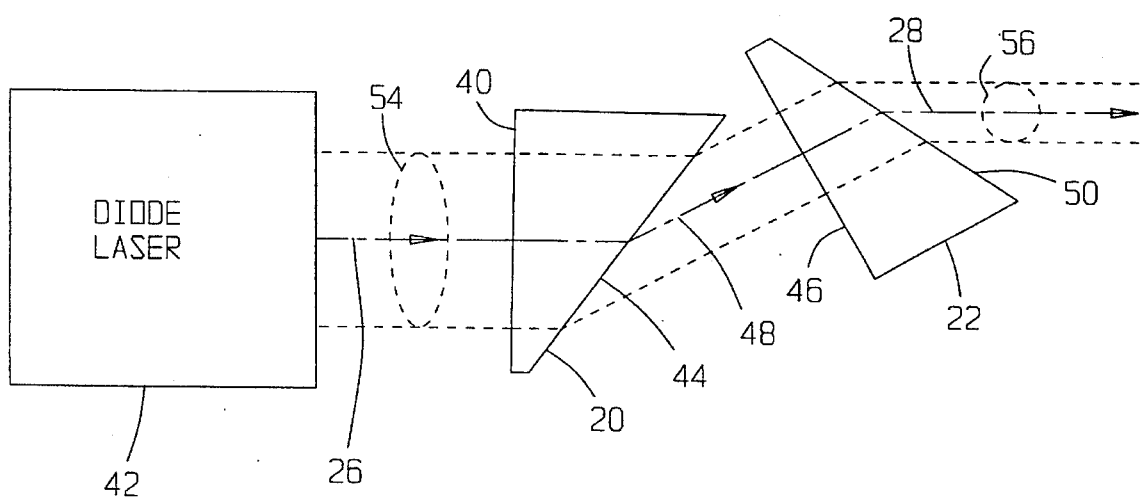
FIG. 4 is a schematic view of the two prisms showing the optical path of the beam.

FIG. 4 shows the shape and angular orientation of first prism 20 and second prism 22. The elliptically shaped input beam 26 strikes the first entrant prism face 40 at an angle slightly off the perpendicular to prevent unwanted reflections back into the diode laser 42 used to generate the incident beam 26. The beam travels through prism 20 and is refracted at the first emergent prism face 44 as shown by the broken lines representing the beam rays. The second entrant prism face 46 is positioned to receive the refracted emergent beam 48 at an angle slightly off the perpendicular to prevent unwanted reflections back into the diode laser 42 used to generate the beam 26. The beam travels through prism 22 and is further refracted at the second emergent prism face 50 as shown by the broken lines representing the beam rays.

The incident beam 26 has an elliptical cross section as shown by the broken line 54. The output beam 28 has a circular cross section as shown by the broken line 56.

The indices of refraction of the prisms 20 and 22 together with the angles (apex angle) and orientation of the faces 44 and 50 are selected to provide achromatic response over the nominal 20 nanometer tuning range of a typical diode laser as will be shown later.

Figure 5:
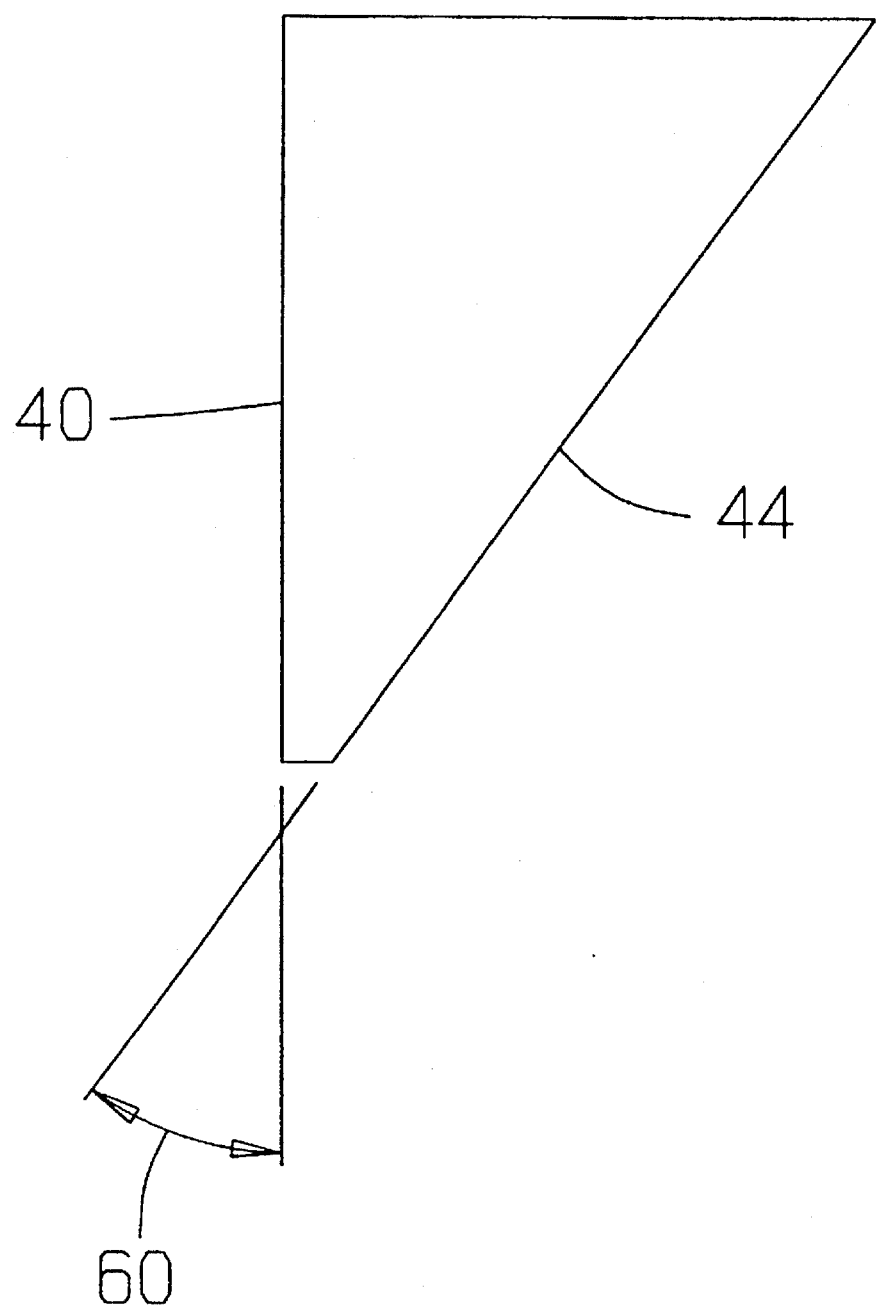
FIG. 5 is a side view of the first prism of the pair used in this invention.

FIG. 5 is a side view of the first prism showing the apex angle 60, the first entrant prism face 40 and the first emergent prism face 44.

Figure 6:
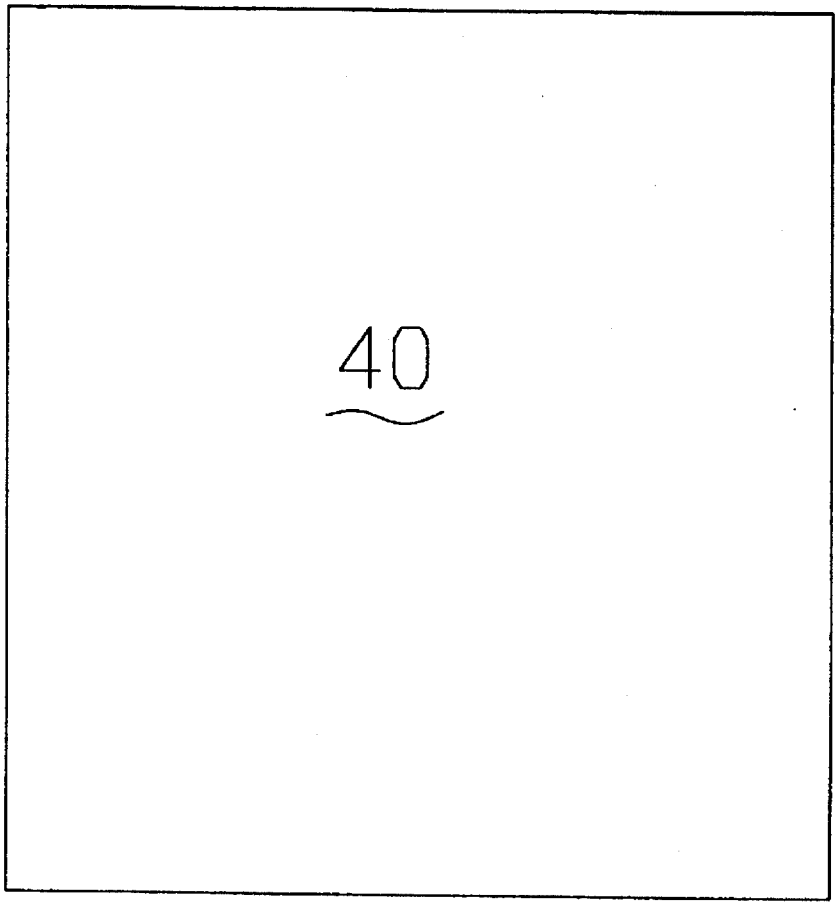
FIG. 6 is an end view of the first prism of the pair used in this invention

FIG. 6 is a view from the entrant side of first prism showing the first entrant prism face 40.

Figure 7:
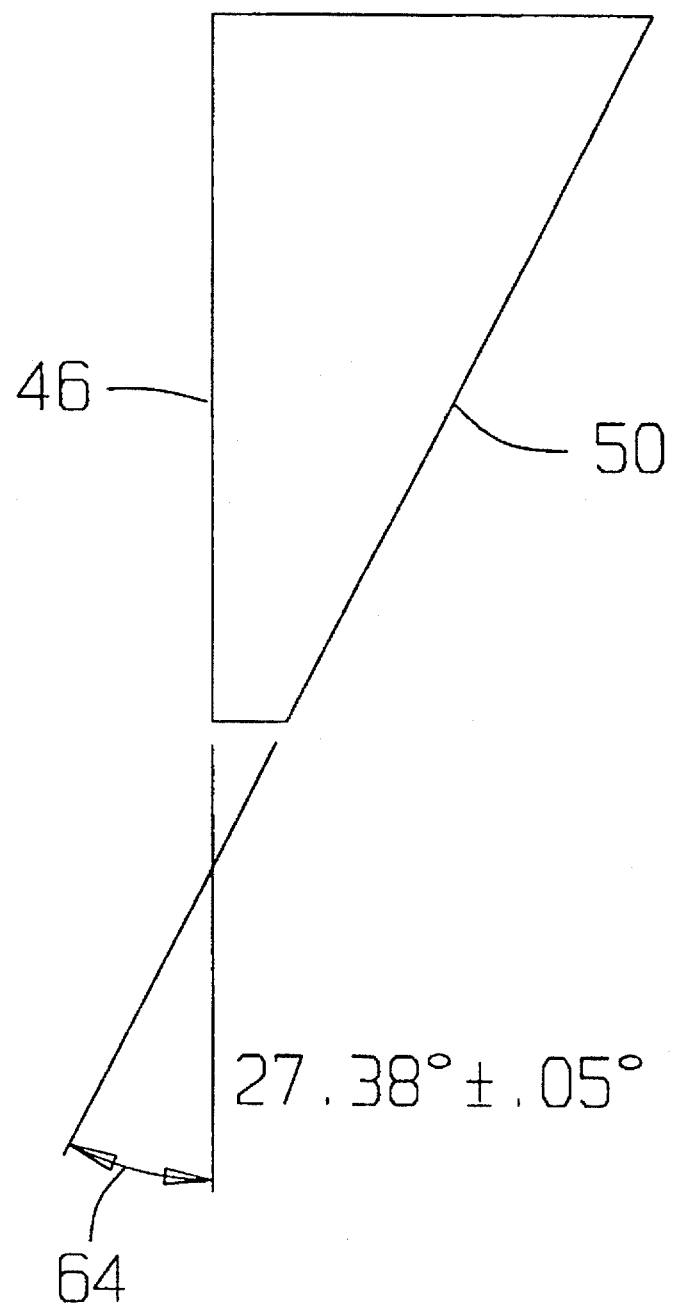
FIG. 7 is a side view of the second prism of the pair used in this invention.

FIG. 7 is a side view of the second prism showing the apex angle 64, the second entrant prism face 46 and the second emergent prism face 50.

Figure 8:
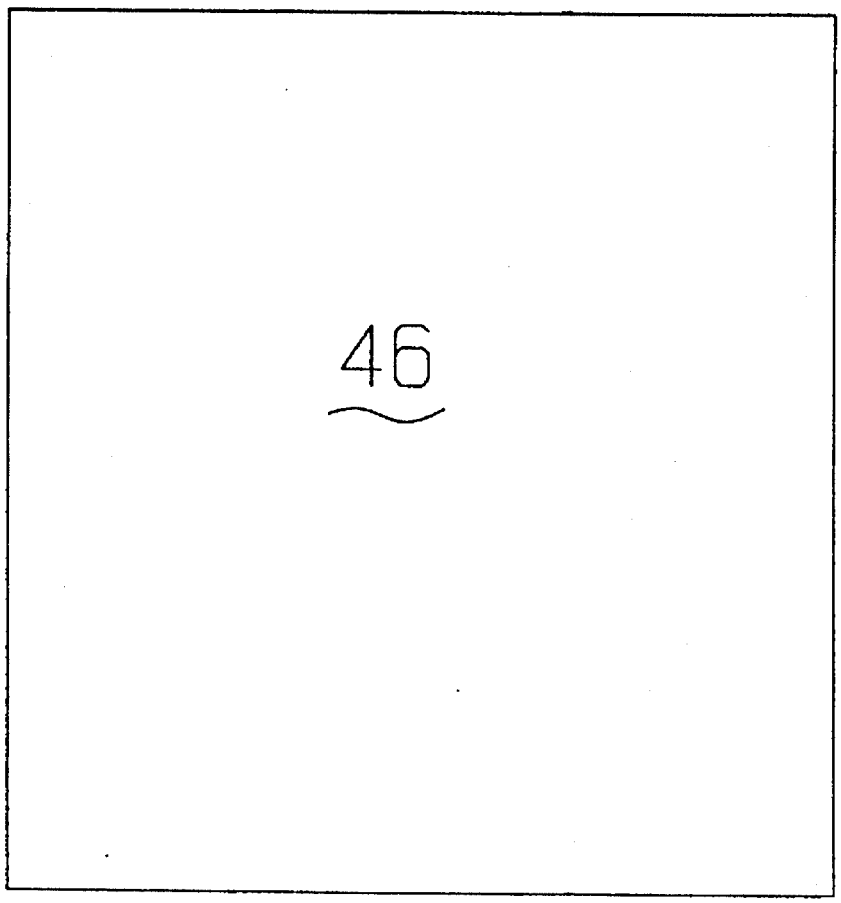
FIG. 8 is an end view of the second prism of the pair used in this invention.

FIG. 8 is a view from the entrant side of second prism showing the second entrant prism face 46.

Figure 9:
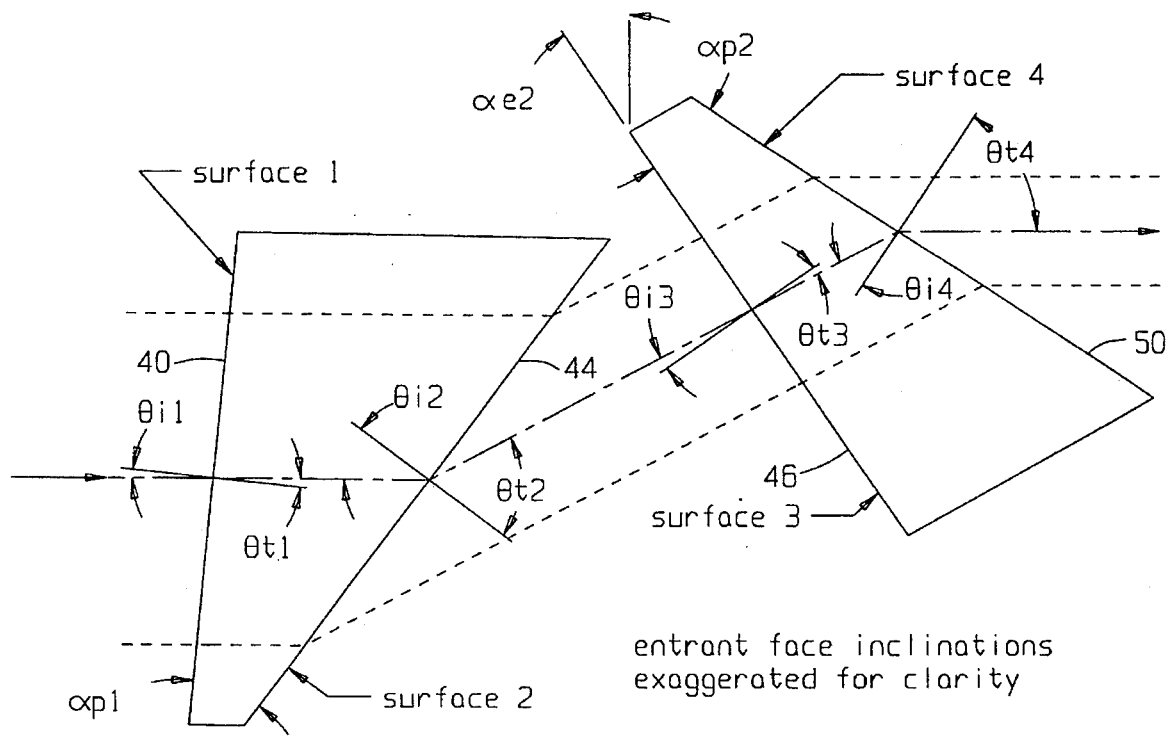
FIG. 9 is a schematic representation of the orientation of the prisms used in this invention.

FIG. 9 is an annotated view of the prisms 20 and 22 with the significant angles identified by the reference characters used in the following computations and the chart of FIG. 11, a portrayal of the intermediate beam angles and other values for a 1000 nanometer range of input beam wavelength at 20 nanometer intervals. The geometry of this figure is generally correct except for the exaggeration of the inclination of the entrant faces 40 and 46.

Figure 10:
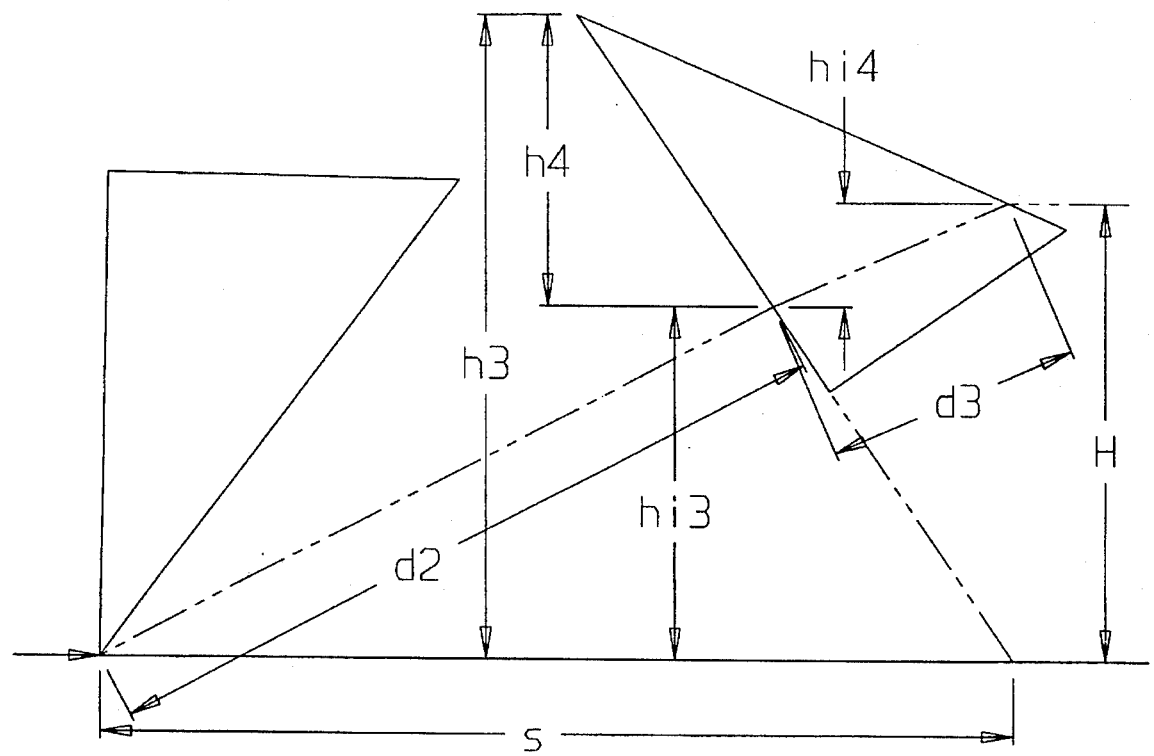
FIG. 10 is an illustration of the dimensions used in the calculations used to illustrate the distance the circularized emergent beam is offset from the elliptical input beam in the prism pair of the invention.

FIG. 10 is an annotated view of the prisms 20 and 22 showing others of the variables used in the calculations which are used to drive the chart of FIG. 11, a portrayal of the beam offset distance (H) in millimeters for a 1000 nanometer range of input beam wavelength variation at 20 nanometer intervals.

The following calculations represent the preferred embodiment of the invention. The material for prism 20 was KF9 and the material for prism 22 was SF11, both materials being obtainable form the Schott Glass Technologies Inc. of Duryea, Pa. The selection of these particular materials was arbitrary and does not represent a limitation of the invention.

Using glass data for KF9 and SF11 supplied by Schott Glass Company (In the following equations ":=+" means "is defined as" and "=" means "result is."

$$N := \begin{pmatrix} 2.2824396 & -8.5960144 \cdot 10^{-3} & 1.3442645 \cdot 10^{-2} & 2.7803535 \cdot 10^{-4} & -4.9998960 \cdot 10^{-7} & 7.7105911 \cdot 10^{-7} & 523515 \\ 3.0539614 & -1.1580432 \cdot 10^{-2} & 3.9199816 \cdot 10^{-2} & 2.9462812 \cdot 10^{-3} & -2.0371019 \cdot 10^{-4} & 2.7633569 \cdot 10^{-5} & 785258 \end{pmatrix}$$

$$i := 1 \qquad \lambda_1 := .800 \qquad j := 0 \qquad k := 1$$

and is further refracted at the second emergent prism face 50 as shown by the broken lines representing the beam rays.

The calculation of the indices of refraction at 800 nanometers for the glass used in the prisms 20 and 22.

$$n1 := \sqrt{N_{j,0} + N_{j,1} \cdot (\lambda_i)^2 + N_{j,2} \cdot (\lambda_i)^{-2} + N_{j,3} \cdot (\lambda_i)^{-4} + N_{j,4} \cdot (\lambda_i)^{-6} + N_{j,5} \cdot (\lambda_i)^{-8}} \qquad n1 = 1.51612$$

$$n2 := \sqrt{N_{k,0} + N_{k,1} \cdot (\lambda_i)^2 + N_{k,2} \cdot (\lambda_i)^{-2} + N_{k,3} \cdot (\lambda_i)^{-4} + N_{k,4} \cdot (\lambda_i)^{-6} + N_{k,5} \cdot (\lambda_i)^{-8}} \qquad n2 = 1.76476$$

The following is an example of the design of a preferred embodiment of the present invention, $$\alpha p1 := 36 \cdot \deg \quad \alpha p2 := 27 \cdot \deg \quad \theta i1 := -1 \cdot \deg \quad \alpha e2 := 30 \cdot \deg \quad h3 := 8 \cdot mm \quad s := 12 \cdot mm$$

$\theta t1 := a\sin\left(\frac{\sin(\theta i1)}{n1}\right)$   $\theta t1 = -0.66 \cdot \deg$   Angle transmitted at surface, using Snell's law $\theta i2 := \alpha p1 - \theta t1$   $\theta i2 = 36.66 \cdot \deg$   Angle incident on surface $\theta t2 := a\sin(n1 \cdot \sin(\theta i2))$   $\theta t2 = 64.852 \cdot \deg$   Angle transmitted at surface $\delta 1 := \theta t2 + \theta i1 - \alpha p1$   $\delta 1 = 27.852 \cdot \deg$   Angle emergent surface, w/r/t initial beam $\theta i3 := \delta 1 - \alpha e2$   $\theta i3 = -2.148 \cdot \deg$   Angle incident on surface $d2 := s \cdot \frac{\cos(\alpha e2)}{\cos(\delta 1 - \alpha e2)}$   $d2 = 10.4 \cdot mm$   Distance along beam between prisms $hi3 := d2 \cdot \sin(\delta 1)$   $hi3 = 4.859 \cdot mm$   Height of beam at second prism $h4 := h3 - hi3$   $h4 = 3.141 \cdot mm$   Height from beam to apex of second prism $\theta t3 := a\sin\left(\frac{\sin(\theta i3)}{n2}\right)$   $\theta t3 = -1.217 \cdot \deg$   Angle transmitted at surface $\theta i4 := \alpha p2 - \theta t3$   $\theta i4 = 28.217 \cdot \deg$   Angle incident on surface $ti3 := \frac{h4}{\cos(\alpha e2)}$   $ti3 = 3.627 \cdot mm$ $d3 := ti3 \cdot \frac{\sin(\alpha p2)}{\cos(\alpha p2 - \theta i4)}$   $d3 = 1.647 \cdot mm$   Distance along beam in second prism $hi4 := \frac{d3}{\cos(\alpha e2 + \theta t3)}$   $hi4 = 1.879 \cdot mm$   Beam change in height in second prism $H := hi3 + hi4$   $H = 6.738 \cdot mm$   Exit beam height $\theta t4 := a\sin(n2 \cdot \sin(\theta i4))$   $\theta t4 = 56.553 \cdot \deg$   Angle transmitted at surface $\delta 4 := \alpha e2 + \alpha p2 - \theta t4$   $\delta 4 = 0.447 \cdot \deg$   Total angular deflection $M := \frac{\cos(\theta t1)}{\cos(\theta i1)} \cdot \frac{\cos(\theta t2)}{\cos(\theta i2)} \cdot \frac{\cos(\theta t3)}{\cos(\theta i3)} \cdot \frac{\cos(\theta t4)}{\cos(\theta i4)}$   $M = 0.322$   Total magnification The following expressions represent a mathematical optimization routine such as provided by MATHCAD, available from Mathsoft, Inc., 201 Broadway, Cambridge, Ma. 02139. The program adjusts the apex angles of prisms 20 and 22 and the orientation prism 22 until the total angular deflection of the beam is exactly zero and the magnification is 0.333 (⅓) at a wavelength of 800 nanometers. In addition, the angle of incidence of the beam on surface 46 of prism 22 is held to approximately 1.5° to eliminate reflections from this surface back into the diode laser. The somewhat cumbersome expressions are the result of multiple substitutions to satisfy the need to specify all the parameters in terms of the allowable variables. (The bold "=" specifies that the program continue the iteration process until the expression is very nearly true.

$TOL := 10^{-8}$   $\theta i1 := -1 \cdot \deg$
Given
Incidence on prisms $$-1.5 \cdot \deg - a\sin\left(n1 \cdot \sin\left(-\alpha p1 + a\sin\left(\frac{\sin(\theta i1)}{n1}\right)\right)\right) + \theta i1 - \alpha p1 - \alpha e2$$

Total angular deflection $$0 = \alpha e2 + \alpha p2 - a\sin\left(n2 \cdot \sin\left(\alpha p2 - a\sin\left(\frac{\sin\left(a\sin\left(n1 \cdot \sin\left(\alpha p1 - a\sin\left(\frac{\sin(\theta i1)}{n1}\right)\right)\right) + \theta i1 - \alpha p1 - \alpha e2\right)}{n2}\right)\right)\right)$$

Magnificaion $$\frac{1}{3} = \frac{\sqrt{1 - \frac{\sin(\theta i1)^2}{n1^2}}}{\cos(\theta i1)} \cdot \frac{\sqrt{1 - n1^2 \cdot \sin\left(\alpha p1 - a\sin\left(\frac{\sin(\theta i1)}{n1}\right)\right)^2}}{\cos\left(\alpha p1 - a\sin\left(\frac{\sin(\theta i1)}{n1}\right)\right)}$$

$$\sqrt{1 - \frac{\sin\left(a\sin\left(n1 \cdot \sin\left(\alpha p1 - a\sin\left(\frac{\sin(\theta i1)}{n1}\right)\right)\right) + \theta i1 - \alpha p1 - \alpha e2\right)^2}{n2^2}}$$

$$\cos\left(a\sin\left(n1 \cdot \sin\left(\alpha p1 - a\sin\left(\frac{\sin(\theta i1)}{n1}\right)\right)\right) + \theta i1 - \alpha p1 - \alpha e2\right)$$

$$\frac{\sqrt{1 - n2^2 \cdot \sin\left(\alpha p2 - a\sin\left(\frac{\sin\left(a\sin\left(n1 \cdot \sin\left(\alpha p1 - a\sin\left(\frac{\sin(\theta i1)}{n1}\right)\right)\right) + \theta i1 - \alpha p1 - \alpha e2\right)}{n2}\right)\right)^2}}{\cos\left(\alpha p2 - a\sin\left(\frac{\sin\left(a\sin\left(n1 \cdot \sin\left(\alpha p1 - a\sin\left(\frac{\sin(\theta i1)}{n1}\right)\right)\right) + \theta i1 - \alpha p1 - \alpha e2\right)}{n2}\right)\right)}$$

$\begin{bmatrix} \alpha p1 \\ \alpha p2 \\ \alpha e2 \end{bmatrix} := \text{Find}(\alpha p1, \alpha p2, \alpha e2) \qquad \begin{bmatrix} \alpha p1 \\ \alpha p2 \\ \alpha e2 \end{bmatrix} = \begin{pmatrix} 35.927 \\ 27.384 \\ 29.217 \end{pmatrix} \cdot \text{deg} \qquad \text{ERR} = 1.015 \cdot 10^{-15}$

RESULTS:

$\theta t1 := a\sin\left(\frac{\sin(\theta i1)}{n1}\right)$    $\theta t1 = -0.66 \cdot \text{deg}$    Angle transmitted at surface 1, using Snell's law $\theta i2 := \alpha p1 - \theta t1$    $\theta i2 = 36.587 \cdot \text{deg}$    Angle incident on surface 2

$\theta t2 := a\sin(n1 \cdot \sin(\theta i2))$    $\theta t2 = 64.644 \cdot \text{deg}$    Angle transmitted at surface 2

$\delta 1 := \theta t2 + \theta i1 - \alpha p1$    $\delta 1 = 27.717 \cdot \text{deg}$    Angle emergent surface 2, w/r/t initial beam $\theta i3 := \delta 1 - \alpha e2$    $\theta i3 = -1.5 \cdot \text{deg}$    Angle incident on surface 3

$d2 := s \cdot \frac{\cos(\alpha e2)}{\cos(\delta 1 - \alpha e2)}$    $d2 = 10.477 \cdot \text{mm}$ $hi3 := d2 \cdot \sin(\delta 1)$    $hi3 = 4.873 \cdot \text{mm}$ $h4 := h3 - hi3$    $h4 = 3.127 \cdot \text{mm}$ $\theta t3 := a\sin\left(\frac{\sin(\theta i3)}{n2}\right)$    $\theta t3 = -0.85 \cdot \text{deg}$    Angle transmitted at surface 3

$ti3 := \frac{h4}{\cos(\alpha e2)}$    $ti3 = 3.583 \cdot \text{mm}$ $\theta i4 := \alpha p2 - \theta t3$    $\theta i4 = 28.234 \cdot \text{deg}$    Angle incident on surface $d3 := ti3 \cdot \frac{\sin(\alpha p2)}{\cos(\alpha p2 - \theta i4)}$    $d3 = 1.648 \cdot \text{mm}$ $hi4 := \frac{d3}{\cos(\alpha e2 + \theta t3)}$    $hi4 = 1.873 \cdot \text{mm}$ $H := hi3 + hi4$    $H = 6.746 \cdot \text{mm}$ $\theta t4 := a\sin(n2 \cdot \sin(\theta i4))$    $\theta t4 = 56.601 \cdot \text{deg}$    Angle transmitted at surface $\delta 4 := \alpha e2 + \alpha p2 - \theta t4$    $\delta 4 = 0 \cdot \text{deg}$    Angle emergent surface, ie, total angular deflection $M := \frac{\cos(\theta t1)}{\cos(\theta i1)} \cdot \frac{\cos(\theta t2)}{\cos(\theta i2)} \cdot \frac{\cos(\theta t3)}{\cos(\theta i3)} \cdot \frac{\cos(\theta t4)}{\cos(\theta i4)}$    $M = 0.333$    Total magnification At this point, the design reaches the correct magnification and output alignment for the single wavelength but has not considered the output beam drift which accompanies a shift in input beam wavelength. It is therefore necessary to extend the optimization and design to a plurality of input beam wavelengths until a satisfactory design had been achieved.

Although the endpoint of the design process is somewhat arbitrary, the design goal was a beam deviation of a fraction of the beam divergence, typically 0.03 degrees, over the tuning range of a typical diode laser, typically 20 nanometers.

$i := 0..49 \qquad \lambda_i := .6 + .02 \cdot i \qquad h3 := 8 \qquad s := 12$ $n1_i := \sqrt{N_{j,0} + N_{j,1} \cdot (\lambda_i)^2 + N_{j,2} \cdot (\lambda_i)^{-2} + N_{j,3} \cdot (\lambda_i)^{-4} + N_{j,4} \cdot (\lambda_i)^{-6} + N_{j,5} \cdot (\lambda_i)^{-8}}$ $n2_i := \sqrt{N_{k,0} + N_{k,1} \cdot (\lambda_i)^2 + N_{k,2} \cdot (\lambda_i)^{-2} + N_{k,3} \cdot (\lambda_i)^{-4} + N_{k,4} \cdot (\lambda_i)^{-6} + N_{k,5} \cdot (\lambda_i)^{-8}}$ -continued $$\theta t1_i := a\sin\left(\frac{\sin(\theta i1)}{n1_i}\right) \qquad \theta i2_i := \alpha p1 - \theta t1_i \qquad \theta t2_i := a\sin(n1_i \cdot \sin(\theta i2_i)) \qquad \delta 1_i := \theta t2_i + \theta i1 - \alpha p1$$

$$d2_i := s \cdot \frac{\cos(\alpha e2)}{\cos(\delta 1_i - \alpha e2)} \qquad hi3_i := d2_i \cdot \sin(\delta 1_i) \qquad \theta i3_i := \delta 1_i - \alpha e2 \qquad h4_i := h3 - hi3_i$$

$$\theta t3_i := a\sin\left(\frac{\sin(\theta i3_i)}{n2_i}\right) \qquad ti3_i := \frac{h4_i}{\cos(\alpha e2)} \qquad \theta i4_i := \alpha p2 - \theta t3_i \qquad d3_i := ti3_i \cdot \frac{\sin(\alpha p2)}{\cos(\alpha p2 - \theta i4_i)}$$

$$hi4_i := \frac{d3_i}{\cos(\alpha e2 + \theta t3_i)} \qquad H_i := hi3_i + hi4_i \qquad \theta t4_i := a\sin(n2_i \cdot \sin(\theta i4_i)) \qquad \delta 4_i := \alpha e2 + \alpha p2 - \theta t4_i$$

$$M_i := \frac{\cos(\theta t1_i)}{\cos(\theta i1)} \cdot \frac{\cos(\theta t2_i)}{\cos(\theta i2_i)} \cdot \frac{\cos(\theta t3_i)}{\cos(\theta i3_i)} \cdot \frac{\cos(\theta t4_i)}{\cos(\theta i4_i)} \qquad R_i := \frac{1}{M_i} \qquad \delta_i := \frac{\delta 4_i}{\deg}$$

$\max(\delta) - \min(\delta) = 0.324$ $q := 0..48 \quad \text{DIF}_q := |\delta_q - \delta_{q+1}| \qquad \max(\text{DIF}) = 0.01168 \qquad j = 0 \qquad k = 1$ The minimization of output beam drift requires that the proper glass be selected for prisms 20 and 22, in this case Schott Glass Company KF9 and SF11 were chosen. The calculations are now performed for a range of wavelengths, beginning at 600 nanometers and continuing at 20 nanometer increments to 1600 nanometers.

MODE OF OPERATION

The values in the chart of FIG. 11 represent the resulting design. $\lambda i$ represents the wavelength of the input beam, beginning at 600 nanometers and continuing at 20 nanometer intervals to 1600 nanometers. In practice, a much narrower tuning range is used, for example diode lasers are commonly available which cover the range from 780 to 800 nanometers.

n1 represents the index of refraction for prism 20 at the particular wavelength.

n2 represents the index of refraction for prism 22 at the particular wavelength.

$\delta$ represents the angular deviation of the beam

R represents the reduction in one dimension of the beam $\theta t1$ represents the transmitted angle at surface 40.

$\theta i2$ represents incident angle at surface 44.

$\theta t2$ represents transmitted angle at surface 44.

$\theta i3$ represents incident angle at surface 46.

$\theta t3$ represents transmitted angle at surface 44.

$\theta i4$ represents incident angle at surface 50.

H represents the distance the emergent beam is offset from the incident beam.

Figure 12:
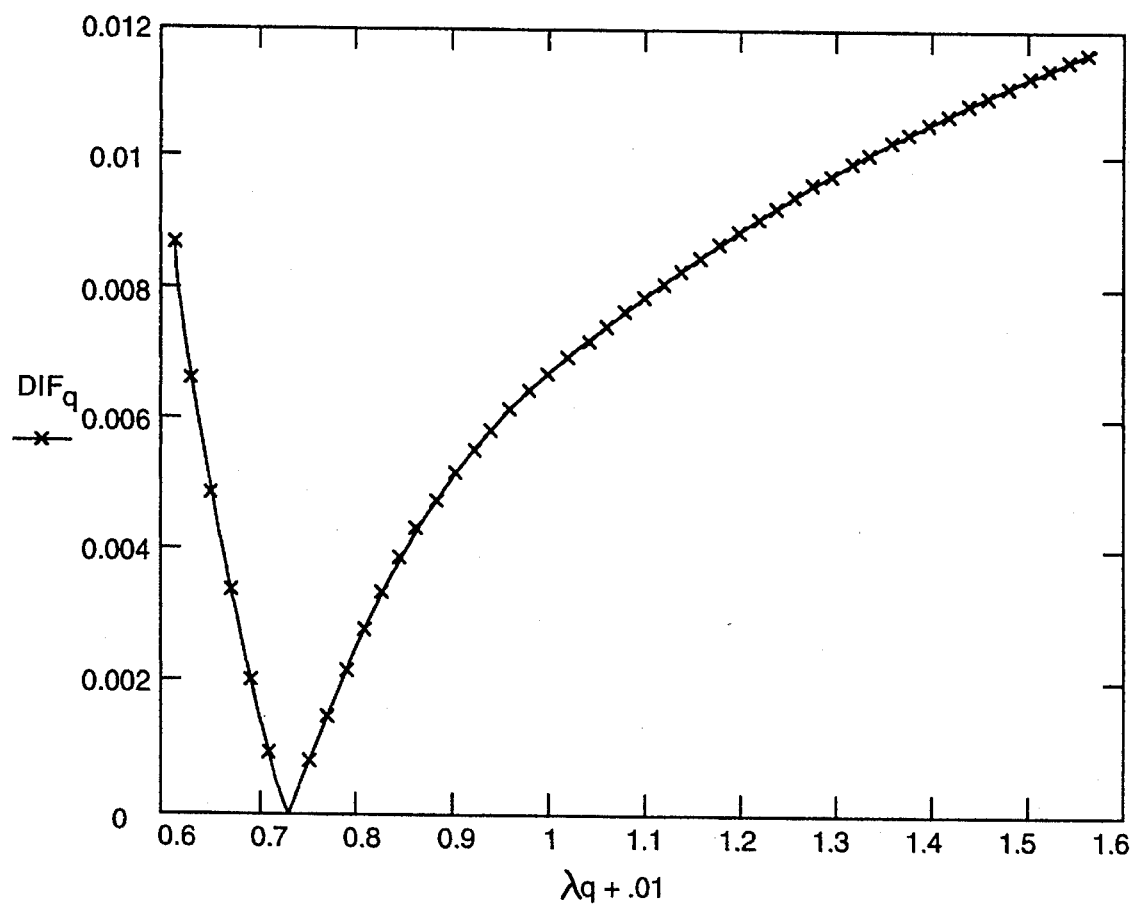
FIG. 12 is a plot of output beam angular change over each 20 nm change of wavelength versus nominal wavelength.

FIG. 12 shows the amount of change in beam angle caused by a 20 nanometer change in wavelength, versus nominal wavelength.

Figure 13:
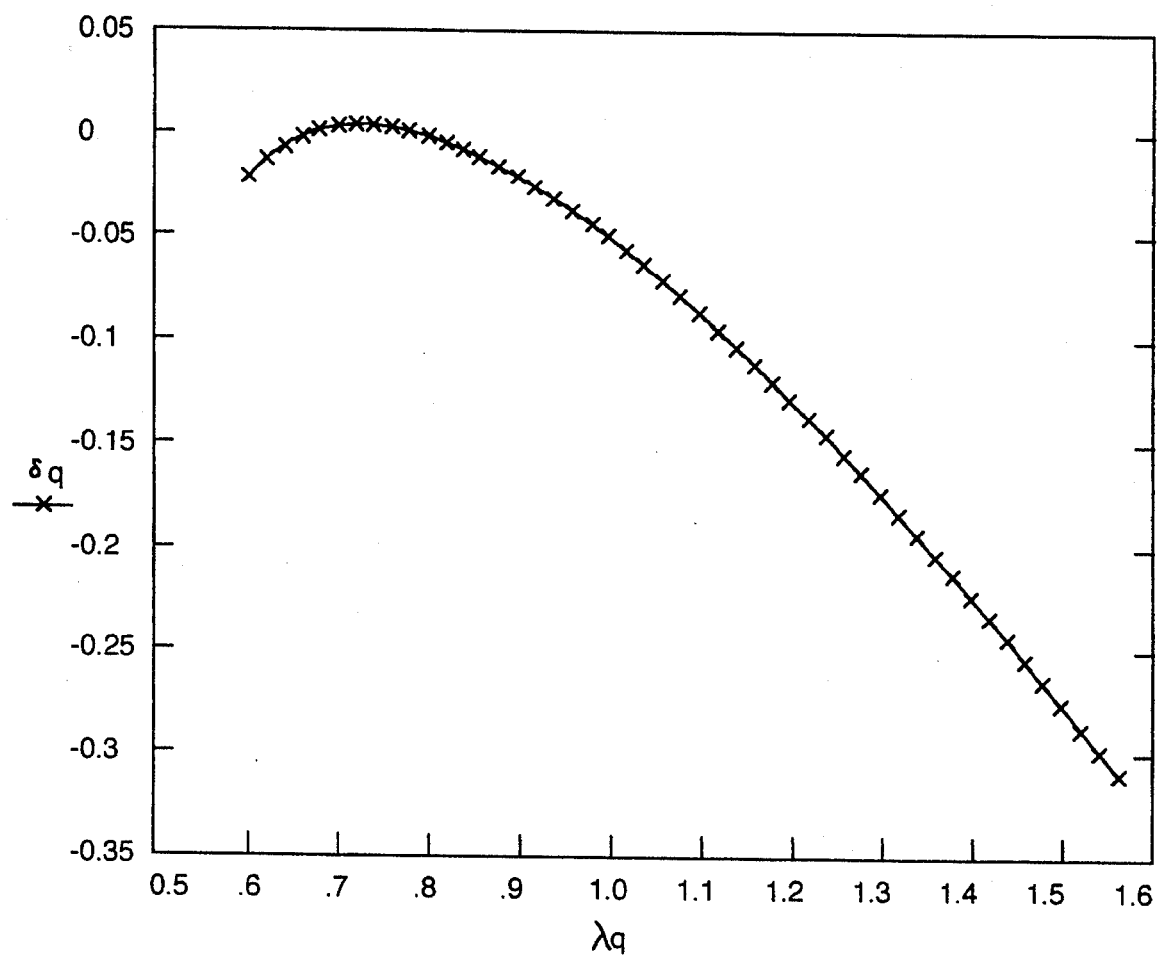
FIG. 13 is a plot of beam output angle versus wavelength.

FIG. 13 shows the output angle of the beam (with respect to the input beam) versus wavelength.

Figure 14:
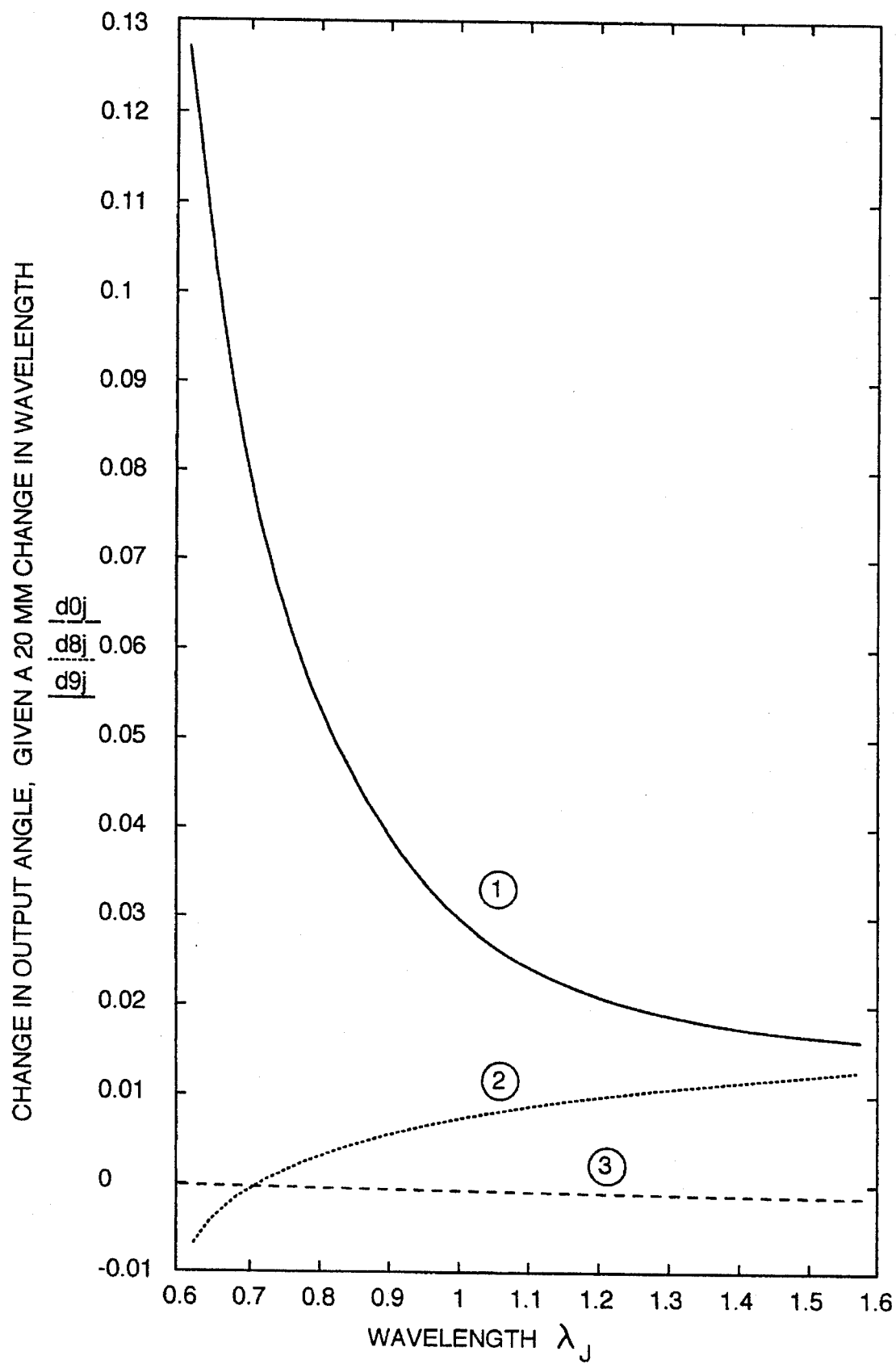
FIG. 14 is a plot of wavelength versus the change in angle of the emergent beam for 20 nm of tuning.

FIG. 14 shows the amount of change in beam angle caused by a 20 nanometer change in wavelength, versus nominal wavelength, for the subject prism pair "2" along with prior art "1", and even more near perfectly achromatic, but impractical to fabricate prism pair, "3".

Figure 15:
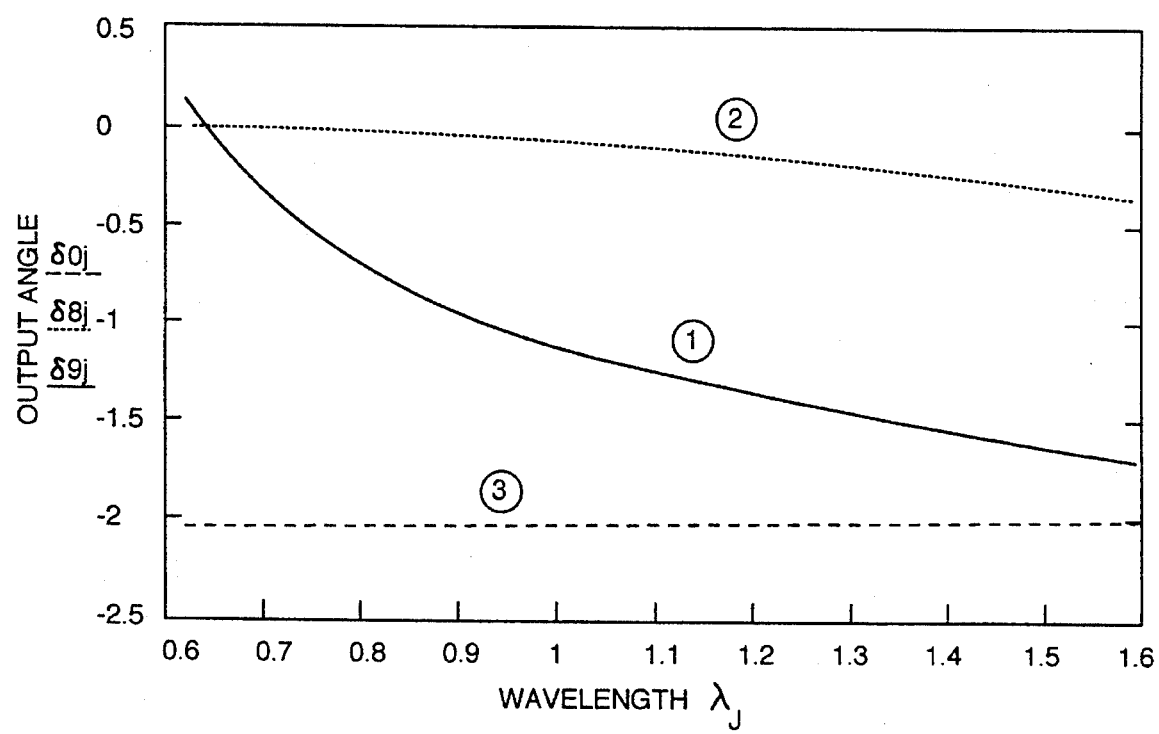
FIG. 15 is a plot of wavelength versus the angle of the emergent beam.

FIG. 15 shows the output angle of the beam versus nominal wavelength for the subject prism pair "2" along with prior art "1", and even more near perfectly achromatic, but impractical to fabricate prism pair, "3".

It will be appreciated that various modifications can be made to the present invention without departing from the apparent scope hereof.

I claim:

1. An achromatic anamorphic prism pair for the conversion of an input beam having an elliptical cross-section to an output beam having a circular cross section comprising;
   a. A first prism, having an index of refraction of 1.51612 at 800 nanometers, a first dispersion, an apex angle of 35.93°, and a first entrant prism face positioned to receive the incident elliptical input beam at an angle greater than 1 degree with respect to the perpendicular of said first entrant prism face and a first emergent prism face from which emerges a first refracted output beam;
   b. a second prism, having an index of refraction of 1.76476 at 800 nanometers, a second dispersion, an apex angle of 27.38°, and a second entrant prism face positioned to receive said first refracted output beam at an angle greater than 1 degree with respect to the perpendicular of said second entrant prism face and a second emergent prism face from which emerges a circular output beam having a first, lateral, displacement from said incident elliptical input beam;
   c. said respective indices of refraction, dispersion, apex angles and relative angular positions of said emergent prism faces selected to provide an anamorphic reduction in the cross section of the incident elliptical beam while maintaining the emergent angle of said circular output beam parallel to the incident elliptical input beam over a change in wavelength of said incident elliptical beam.

2. The achromatic prism pair according to claim 1 wherein said change in wavelength is 20 nanometers.

3. The achromatic anamorphic prism pair according to claim 1 wherein said respective indices of refraction, dispersion apex angles and relative angular positions of said emergent prism faces are selected to provide an anamorphic reduction in the cross section of the incident elliptical beam while maintaining said first, lateral, displacement substantially constant over a 20 nanometer change in wavelength of said incident elliptical beam.

4. An achromatic anamorphic prism pair for the conversion of an input beam having an elliptical cross-section to an output beam having a circular cross section comprising:
   a. a first prism, having an index of refraction of 1.51612 at 800 nanometers, a first dispersion, an apex angle of 35.93°, and a first entrant prism face positioned to receive the incident elliptical input beam at an angle greater than 1 degree with respect to the perpendicular of said first entrant prism face and a first emergent prism face from which emerges a first refracted output beam at an angle of 64.644° at 800 nanometers;

b. a second prism, having an index of refraction of 1.76476 at 800 nanometers, a second dispersion and an apex angle of 27.38°, and a second entrant prism face positioned to receive said first refracted output beam at an angle greater than 1 degree with respect to the perpendicular of said second entrant prism face and a second emergent prism face from which emerges a circular output beam at an angle of 56.601° at 800 nanometers, having a first, lateral, displacement from said incident elliptical input beam; and c. said respective indices of refraction, dispersion, apex angles and relative angular positions of said prisms being selected to provide an anamorphic reduction in the cross section of the incident elliptical beam in said circular output beam.

5. The achromatic anamorphic prism pair according to claim 4 having said respective indices of refraction, dispersion, apex angles and relative angular positions of said emergent prism faces selected to provide an anamorphic reduction in the cross section of the incident elliptical beam while maintaining the emergent angle of said circular output beam parallel to the incident elliptical input beam over a change in wavelength of said incident elliptical beam.

6. The achromatic prism pair according to claim 5 wherein said change in wavelength is 20 nanometers.

7. The achromatic anamorphic prism pair according to claim 6 wherein said respective indices of refraction, dispersion, apex angles and relative angular positions of said emergent prism faces being selected to provide an anamorphic reduction in the cross section of the incident elliptical beam while maintaining said first, lateral, displacement substantially constant over a change in wavelength of said incident elliptical beam.

8. The achromatic prism pair according to claim 7 wherein said change in wavelength is 20 nanometers.

* * * * *